United States Patent
Suciu et al.

(10) Patent No.: US 8,167,237 B2
(45) Date of Patent: May 1, 2012

(54) MOUNTING SYSTEM FOR A GAS TURBINE ENGINE

(75) Inventors: Gabriel L. Suciu, Glastonbury, CT (US); Brian D. Merry, Andover, CT (US); David W. J. Franklin, Simsbury, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1076 days.

(21) Appl. No.: 12/052,769

(22) Filed: Mar. 21, 2008

(65) Prior Publication Data

US 2009/0236469 A1  Sep. 24, 2009

(51) Int. Cl.
*B64D 27/02* (2006.01)
(52) U.S. Cl. ......................................... 244/54
(58) Field of Classification Search .................. 244/54; 248/554–557; 60/796
See application file for complete search history.

(56) References Cited

U.S. PATENT DOCUMENTS

| | | | |
|---|---|---|---|
| 4,966,338 A | 10/1990 | Gordon | |
| 5,136,839 A | 8/1992 | Armstrong | |
| 5,174,525 A | 12/1992 | Schilling | |
| 5,273,393 A | 12/1993 | Jones et al. | |
| 5,275,357 A | 1/1994 | Seelen et al. | |
| 5,277,382 A | 1/1994 | Seelen et al. | |
| 5,320,307 A * | 6/1994 | Spofford et al. | 244/54 |
| 5,372,338 A | 12/1994 | Carlin et al. | |
| 5,409,184 A | 4/1995 | Udall et al. | |
| 5,443,229 A | 8/1995 | O'Brien et al. | |
| 5,452,575 A | 9/1995 | Freid | |
| 5,474,258 A | 12/1995 | Taylor et al. | |
| 5,497,961 A | 3/1996 | Newton | |
| 5,746,391 A | 5/1998 | Rodgers et al. | |
| 5,810,287 A | 9/1998 | O'Boyle et al. | |
| 5,860,276 A | 1/1999 | Newton | |
| 5,871,175 A | 2/1999 | Demouzon et al. | |
| 5,871,176 A | 2/1999 | Demouzon et al. | |
| 5,871,177 A * | 2/1999 | Demouzon et al. | 244/54 |
| 5,921,500 A | 7/1999 | Ellis et al. | |
| 5,927,644 A | 7/1999 | Ellis et al. | |
| 6,126,110 A | 10/2000 | Seaquist et al. | |
| 6,138,949 A | 10/2000 | Manende et al. | |
| 6,189,830 B1 | 2/2001 | Schnelz et al. | |
| 6,347,765 B1 * | 2/2002 | Jule et al. | 244/54 |
| 6,474,597 B1 * | 11/2002 | Cazenave | 244/54 |
| 6,517,027 B1 | 2/2003 | Abruzzese | |
| 6,652,222 B1 | 11/2003 | Wojtyczka et al. | |
| 6,708,925 B2 | 3/2004 | Udall | |
| 6,843,449 B1 | 1/2005 | Manteiga et al. | |
| 6,899,518 B2 | 5/2005 | Lucas et al. | |

(Continued)

OTHER PUBLICATIONS

U.S. Appl. No. 11/832,107 dated Aug. 1, 2007, entitled "Engine Mounting Configuration for a Turbofan Gas Turbine Engine".

*Primary Examiner* — Tien Dinh
(74) *Attorney, Agent, or Firm* — Carlson, Gaskey & Olds PC (57) ABSTRACT

A mounting system for a gas turbine engine includes a mounting linkage assembly and a tangential link positioned generally transverse to the mounting linkage assembly. The mounting linkage assembly reacts at least a thrust load. The tangential link reacts at least a vertical load, a side load, and a torque load of the gas turbine engine.

13 Claims, 7 Drawing Sheets

U.S. PATENT DOCUMENTS

| | | |
|---|---|---|
| 6,935,591 B2 | 8/2005 | Udall |
| 6,976,655 B2 | 12/2005 | Thompson |
| 7,021,585 B2 * | 4/2006 | Loewenstein et al. .......... 244/54 |
| 7,055,330 B2 | 6/2006 | Miller |
| 7,134,286 B2 | 11/2006 | Markarian et al. |
| 7,566,029 B2 * | 7/2009 | Dron et al. ................. 244/54 |
| 2006/0090448 A1 | 5/2006 | Henry |
| 2006/0248900 A1 | 11/2006 | Suciu et al. |

* cited by examiner

MOUNTING SYSTEM FOR A GAS TURBINE ENGINE

BACKGROUND OF THE DISCLOSURE

This disclosure generally relates to a gas turbine engine, and more particularly to a mounting system for mounting a gas turbine engine to an aircraft pylon.

A gas turbine engine may be mounted at various points of an aircraft, such as a pylon integrated with an aircraft structure. For example, a mounting system is often used to support an aircraft engine relative to the pylon. Mounting systems may include any combination of links, ball joints or plates that support the engine vertically, laterally and axially. The mounting system ensures the transmission of a variety of static and dynamic loads between the engine and the aircraft structure. The loads experienced by a mounting system may include vertical loads and side loads (loads experienced perpendicular to a centerline axis of the engine), torque loads (loads experienced in the direction of rotation of the gas turbine engine), and thrust loads (loads experienced in an opposing direction of aircraft travel). The mounting system must absorb the deformations that the engine is subjected to during different flight phases and the dimensional variations caused by thermal expansion and retraction of the engine during operation.

One known mounting system for a gas turbine engine includes a pylon having a forward mount and an aft mount. The forward mount dissipates thrust loads, vertical loads, and side loads experienced adjacent a front end of the engine. Meanwhile, the rear mount dissipates vertical loads, side loads, torque loads, and thrust loads experienced adjacent a rear end of the engine.

Mounting systems of this type are unable to adequately react static (weight) and dynamic (maneuver) loads created during operation of the engine as the engine distorts and flexes. The engine loads may distort the casing that surrounds the various engine components. This distortion can cause the clearances between the static casing and a plurality of rotating blade tips encased within the static casing to increase. This may negatively effect engine performance and increase fuel burn.

Accordingly, it is desirable to provide a mounting system for a gas turbine engine that minimizes tip clearances, is compact, and adequately dissipates the transmission of loads between the engine and the aircraft structure.

SUMMARY OF THE DISCLOSURE

A mounting system for a gas turbine engine includes a mounting linkage assembly and at least one tangential link positioned generally transverse to the mounting linkage assembly. The mounting linkage assembly reacts at least a thrust load. The tangential link reacts at least a vertical side, a side load, and a torque load.

A gas turbine engine includes a compressor section, a combustor section, a turbine section, a pylon and a mounting system. The mounting system includes a front mount and a rear mount that each extend from the pylon. The rear mount includes a mounting linkage assembly having a first body portion and a second body portion separate from the first body portion. The first body portion and the second body portion provide a redundant connection between the gas turbine engine and the pylon.

A method for mounting a gas turbine engine includes positioning a mounting linkage assembly between the gas turbine engine and a pylon, connecting a tangential link between the gas turbine engine and the mounting linkage assembly, and connecting at least one thrust link between the gas turbine engine and the mounting linkage assembly. The tangential link reacts at least a vertical load, a side load, and a torque load from the gas turbine engine, through the tangential link and the mounting linkage assembly, and to the pylon. The thrust link reacts a thrust load from the gas turbine engine, through the thrust link and the mounting linkage assembly, and to the pylon.

The various features and advantages of this disclosure will become apparent to those skilled in the art from the following detailed description. The drawings that accompany the detailed description can be briefly described as follows.

DETAILED DESCRIPTION OF THE PREFERRED EMBODIMENT

Figure 1:
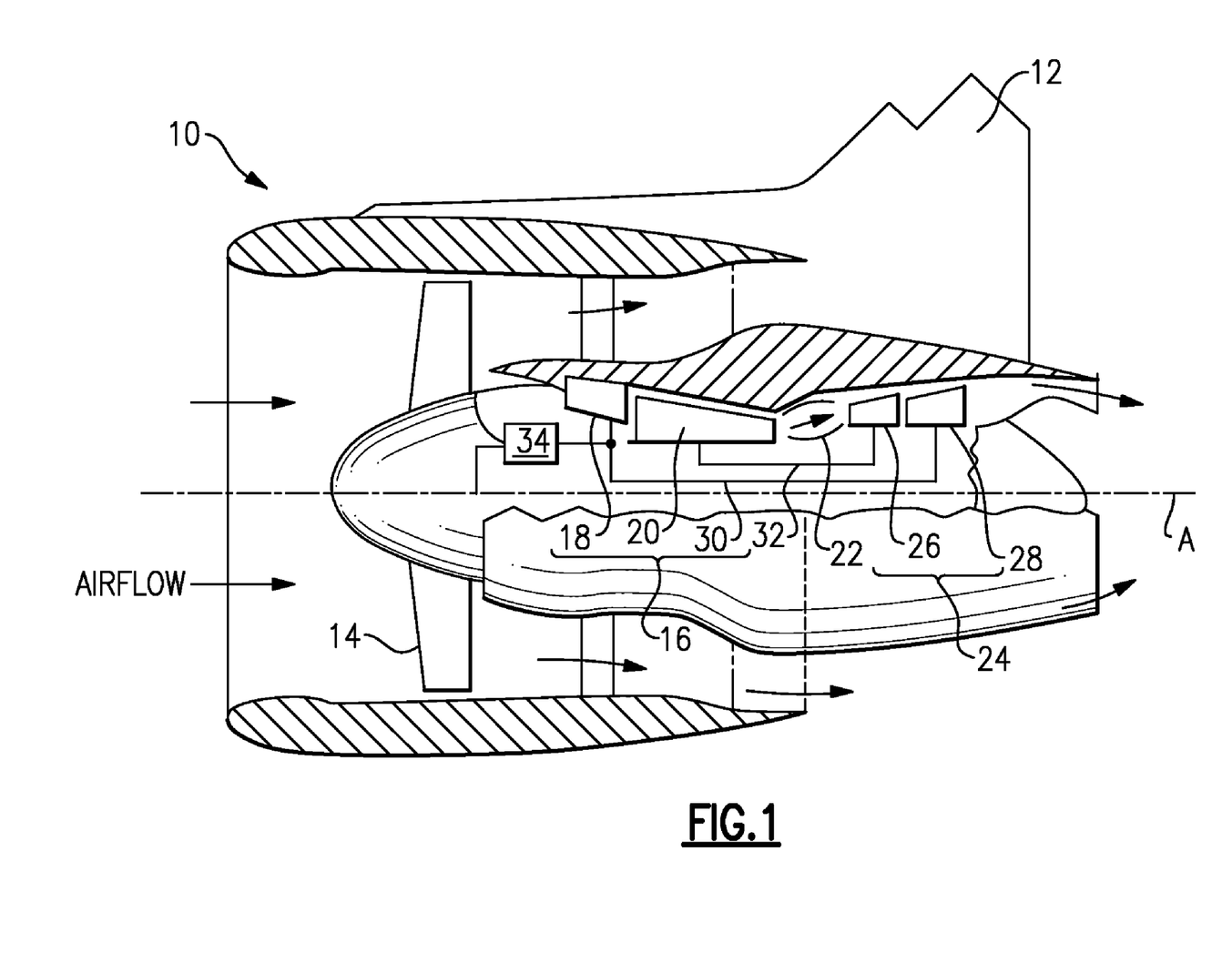
FIG. 1 illustrates a general perspective view of a gas turbine engine.

FIG. 1 illustrates a gas turbine engine 10 suspended from an engine pylon 12 as is typical of an aircraft designed for subsonic operation. In one example, the gas turbine engine 10 is a turbofan gas turbine engine. The gas turbine engine 10 includes a fan section 14, a compressor section 16 having a low pressure compressor 18 and a high pressure compressor 20, a combustor section 22, and a turbine section 24 having a high pressure turbine 26 and a low pressure turbine 28. A low speed shaft 30 rotationally supports the low pressure compressor 18 and the low pressure turbine 28. The low speed shaft 30 also drives the fan section 14 either directly, or through a gear train 34, for example. A high speed shaft 32 rotationally supports the high pressure compressor 20 and the high pressure turbine 26. The low speed shaft 30 and the high speed shaft 32 rotate about a longitudinal centerline axis A of the gas turbine engine 10.

During operation, airflow is drawn into the gas turbine engine 10 by the fan section 14 and is pressurized in the compressor section 16. Fuel is mixed with the pressurized air and combusted within the combustor section 22. The combustion gases are discharged through the turbine section 24 which extracts energy therefrom for powering the compressor section 16 and the fan section 14. Of course, this view is highly schematic. It should be understood that the features and example illustrations presented herein are not limited to a turbofan gas turbine engine. That is, the present disclosure is applicable to any engine architecture.

Figure 2:
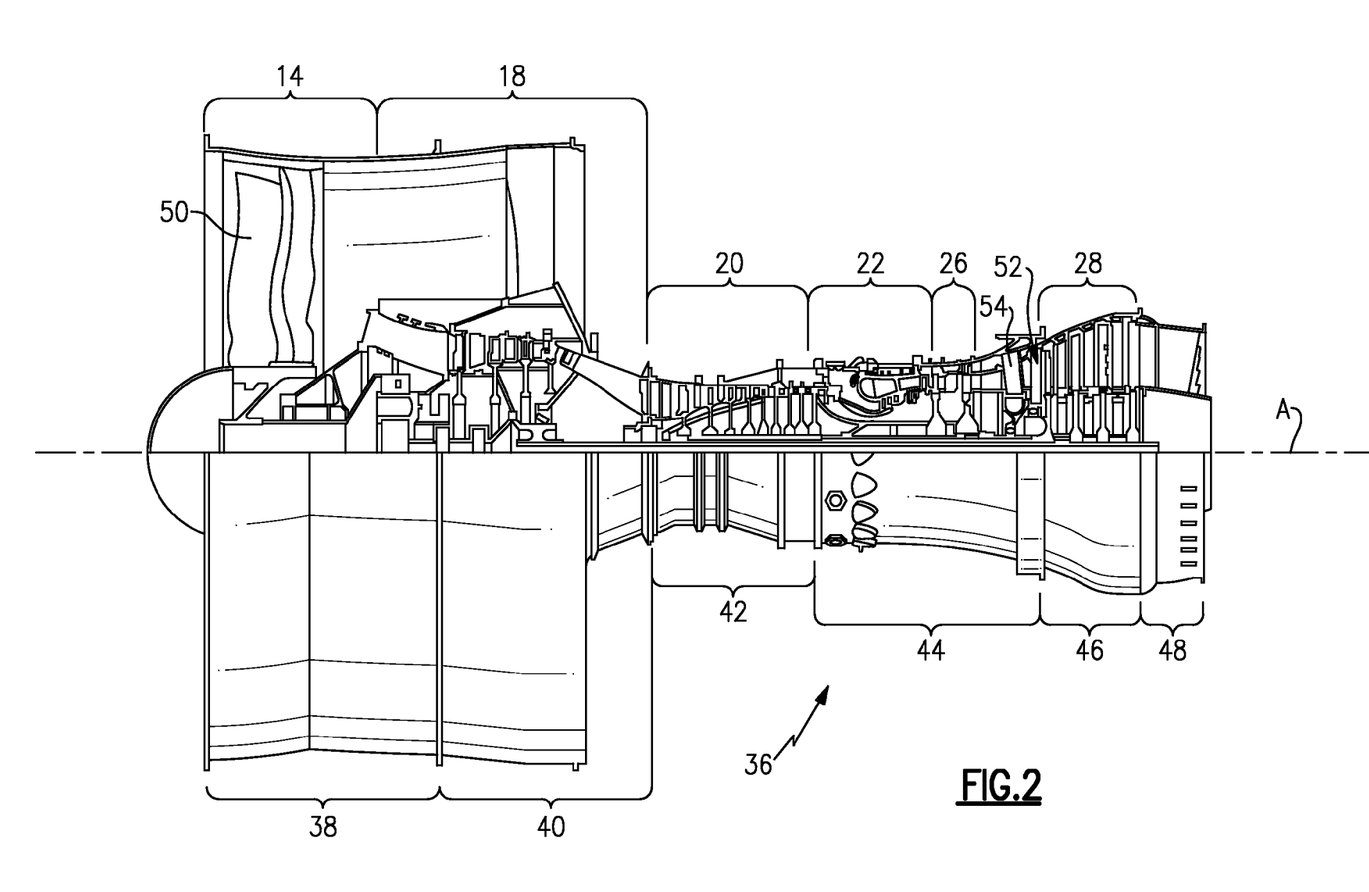
FIG. 2 illustrates a partial sectional view of an example gas turbine engine having an engine static case structure on the lower half thereof.

FIG. 2 illustrates an engine static case structure 36 of the example gas turbine engine 10. The engine static case structure 36 generally includes a fan case 38, an intermediate case (IMC) 40, a high pressure compressor case 42, a diffuser case 44, a low pressure turbine case 46, and a turbine exhaust case 48. The fan section 14 includes a plurality of circumferentially spaced fan blades 50 that are surrounded by the fan case 38.

In one example, the turbine section 24 includes a mid turbine frame (MTF) 52 that includes a plurality of radially extending structural struts 54 that are preloaded in tension. The MTF 52 provides aft structural support within the diffuser case 44 and rotatably supports the low speed shaft 30 and the high speed shaft 32.

Figure 3:
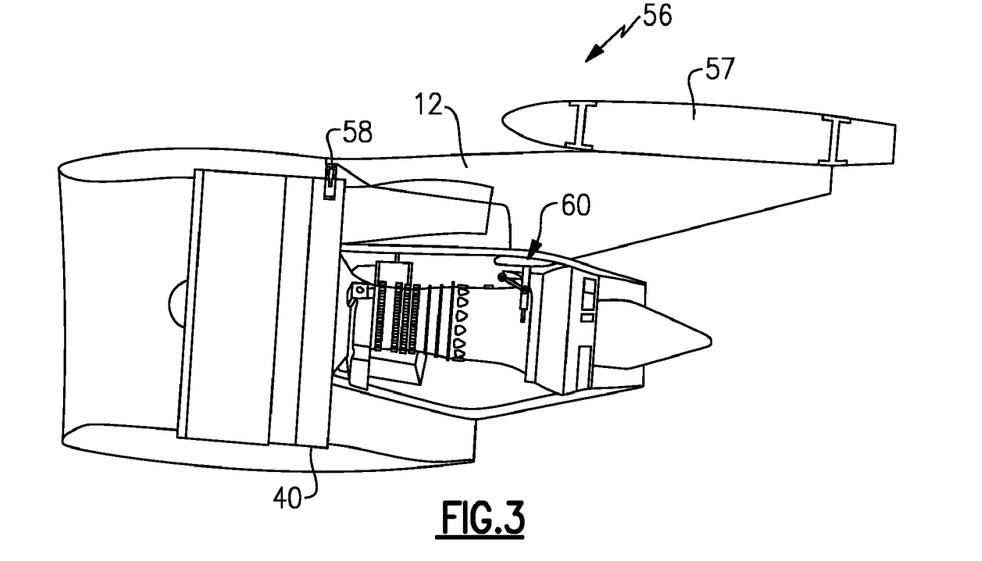
FIG. 3 illustrates an example mounting system for a gas turbine engine having a front mount at a first location.
Figure 4:
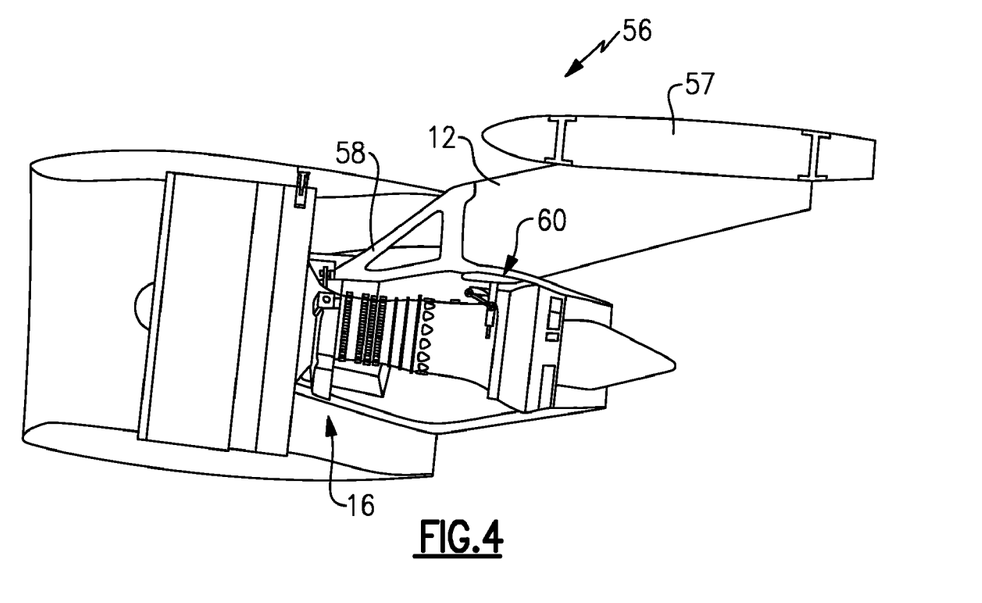
FIG. 4 illustrates the example mounting system illustrated in FIG. 3 having a front mount at a second location.

FIG. 3 illustrates an example mounting system 56 for mounting the gas turbine engine 10 to an aircraft structure, such as an aircraft wing 57, which includes the pylon 12. The mounting system 56 includes a front mount 58 and a rear mount 60. In this example, the front mount 58 is secured to the IMC 40. In another example, the front mount 58 is secured to a portion of the core engine, such as the compressor section 16 of the gas turbine engine 10 (see FIG. 4). A person of ordinary skill in the art having the benefit of this disclosure would be able to select an appropriate mounting location for the front mount 58.

The front mount 58 distributes and dissipates engine loads about the gas turbine engine 10. For example, the front mount 58 reacts both vertical loads and side loads experienced by the gas turbine engine 10. Vertical loads are loads created by the weight of the gas turbine engine 10. Side loads are engine loads that are created through crosswinds and/or maneuvering of the gas turbine engine 10. Both the vertical loads and the side loads are perpendicular to the longitudinal centerline axis A of the gas turbine engine 10.

The term "reacts" as utilized in this disclosure is defined as absorbing a load and dissipating the load to another location of the gas turbine engine 10. For example, the front mount 58 may react the vertical loads and side loads of the gas turbine engine 10 to the pylon 12. In one example, the front mount 58 is a shackle arrangement and includes a generally plate-like member that is oriented to connect the front mount 58 to the pylon 12 and a portion of the gas turbine engine 10.

Figure 5A:
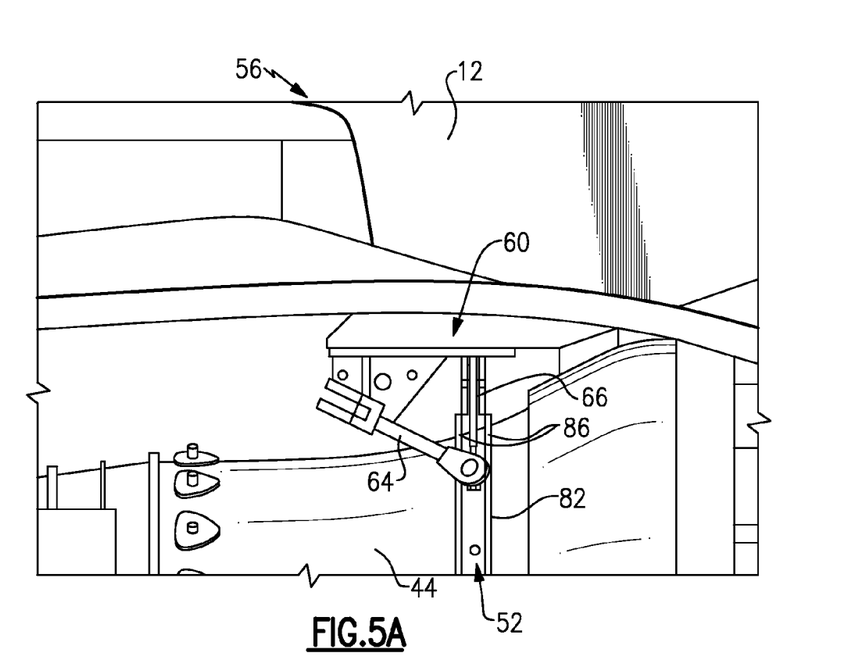
FIG. 5A illustrates a side view of a rear mount of the example mounting system illustrated in FIGS. 3 and 4.
Figure 5B:
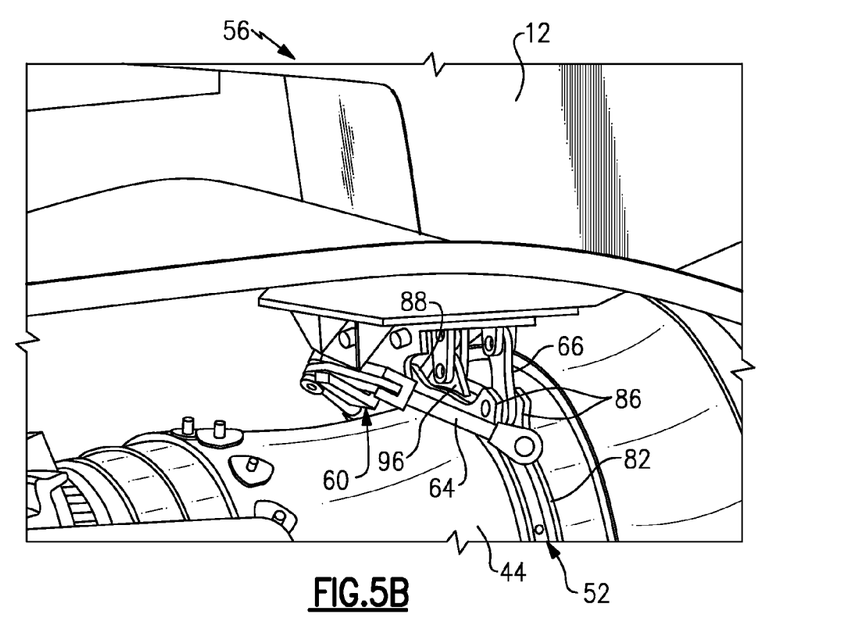
FIG. 5B illustrates an isometric view of the example rear mount of the mounting system illustrated in FIG. 5A.

FIGS. 5A and 5B illustrate an example rear mount 60 of the mounting system 56. In this example, the rear mount 60 is secured to the diffuser case 44 of the gas turbine engine 10. In another example, the rear mount 60 is secured adjacent to the MTF 52 of the turbine section 24. In yet another example, the rear mount 60 is secured to the gas turbine engine 10 adjacent to the turbine exhaust case 48. It should be understood that the rear mount may alternatively be mounted at any other region of the gas turbine engine 10.

Figure 6A:
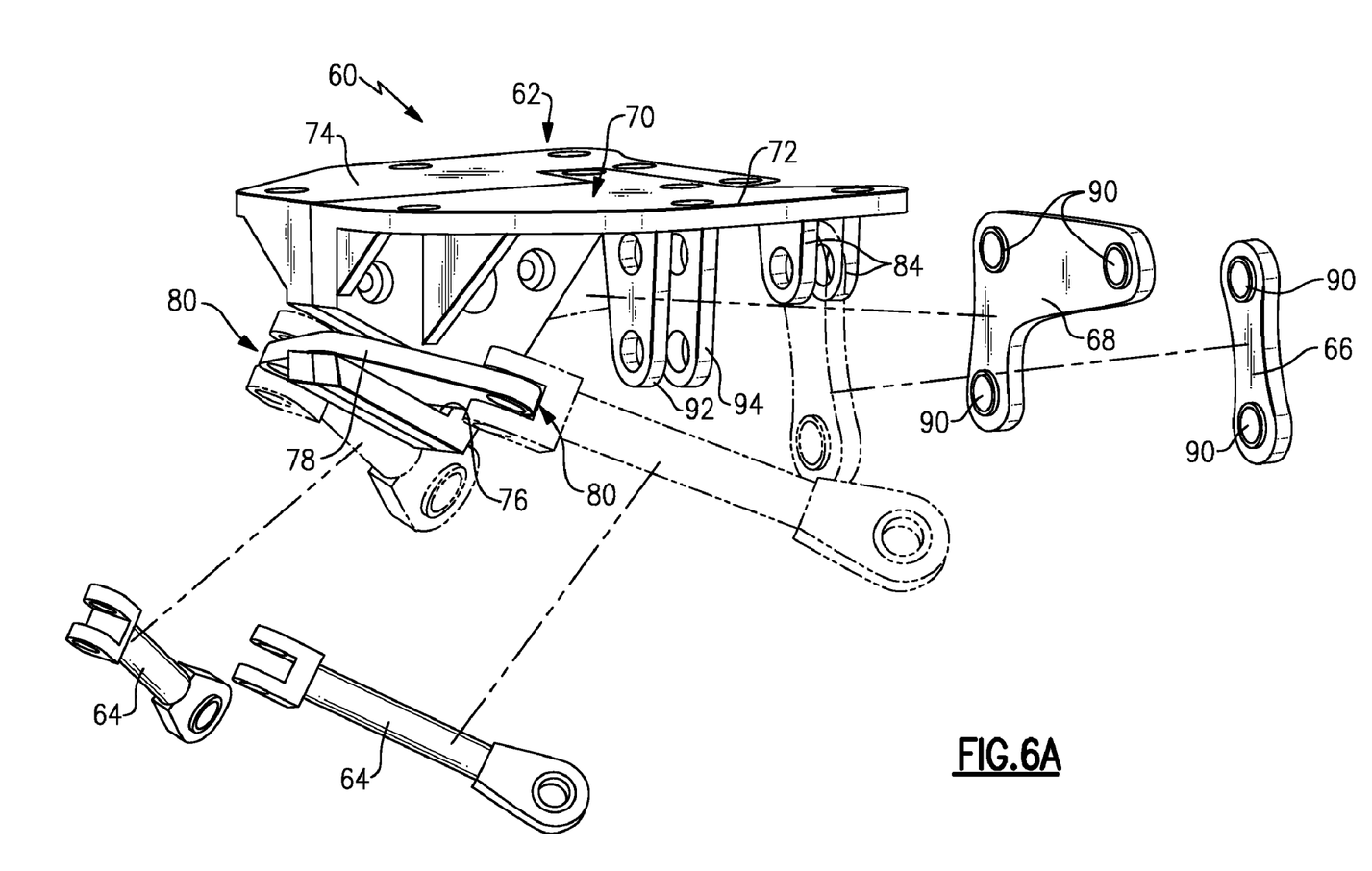
FIG. 6A illustrates an exploded view of an example mounting system including a rear mount having a mounting linkage assembly.
Figure 6B:
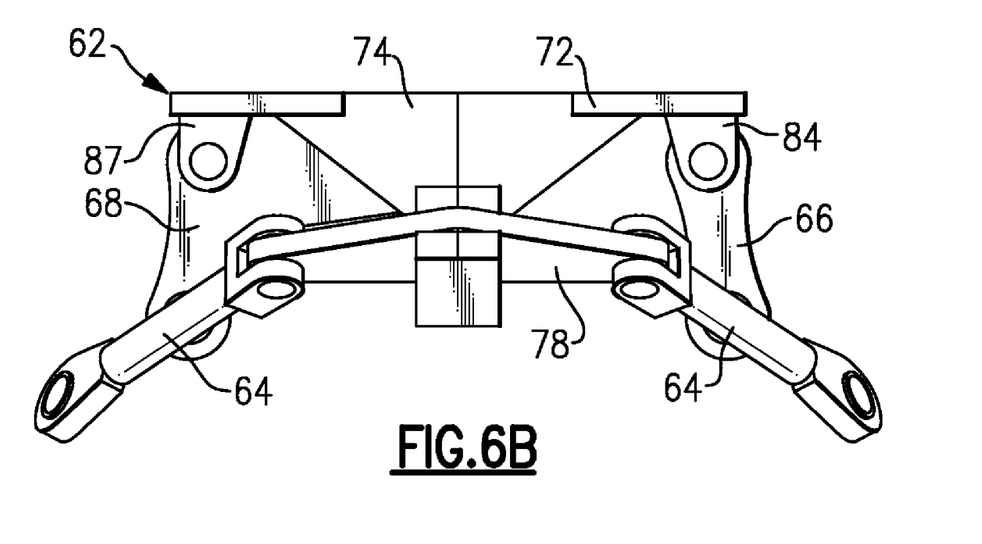
FIG. 6B illustrates a front view of the rear mount illustrated in FIG. 6A.
Figure 6C:
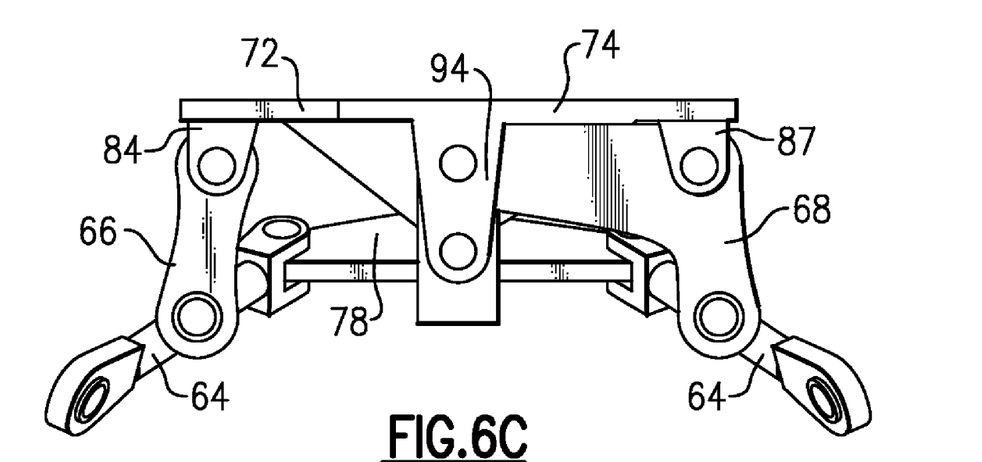
FIG. 6C illustrates a rear view of the rear mount illustrated in FIG. 6A.

Referring to FIGS. 6A, 6B and 6C, with continued reference to FIGS. 5A and 5B, the rear mount 60 includes a mounting linkage assembly 62, thrust links 64, a tangential link 66 and a three-point link 68 (i.e., boomerang link 68). In one example, the mounting linkage assembly 62 is positioned between the diffuser case 44 and the pylon 12. In this example, the mounting linkage assembly 62 is a wiffle tree assembly. The mounting linkage assembly 62 includes a top surface 70 that is substantially flat, in one example. The top surface 70 is received against and fastened to a portion of the pylon 12 to mount the gas turbine engine 10 to the pylon 12.

The mounting linkage assembly 62 includes a first body portion 72 and a second body portion 74. The first body portion 72 is a separate and distinct component from the second body portion 74. That is, the mounting linkage assembly 62 is composed of two separate halves that create a redundant connection between the thrust links 64 and the pylon 12, as is further discussed below. The first body portion 72 is bolted to the second body portion 74, in one example.

In one example, the first body portion 72 includes a slot 76 that receives a swing beam 78. The swing beam 78 is rotatably secured within the slot 76. The thrust links 64 are connected to opposing sides 80 of the swing beam 78 and extend in a downstream direction relative to the gas turbine engine 10. The thrust links 64 are connected at an opposite end of the swing beam 78 to a flange 82 formed by the diffuser case 44, in one example. The thrust links 64 are fastened to both the swing beam 78 and the flange 82 (See FIGS. 5A and 5B) such as by bolting, for example. In another example, the thrust links 64 are positioned at an angle between the mounting linkage assembly 62 and the flange 82 of the diffuser case 44.

The swing beam 78 equalizes a thrust load between the thrust links 64. That is, in the event one thrust link 64 fails, the swing beam 78 bottoms out on an opposite side from the failure to allow the non-failed thrust link 64 to transmit thrust forces to the pylon 12. That is, the thrust links 64, in connection with the mounting linkage assembly 62, provide redundant connections for the fail safe mounting of the gas turbine engine 10.

The mounting linkage assembly 62 includes a plurality of link connectors 84 for connecting the tangential link 66 and the boomerang link 68 between the body portions 72, 74 of the mounting linkage assembly 62 and the diffuser case 44. In this example, the tangential link 66 is connected between a link connector 84 of the first body portion 72 and a corresponding link connector 86 of the flange 82 of the diffuser case 44. The boomerang link 68 is connected between a link connector 87 of the second body portion 74 and a link connector 88 of the diffuser case 44 flange 82. It should be understood that an opposite configuration is possible in which the boomerang link 68 is connected to the first body portion 72 and the tangential link 66 is connected to the second body portion 74.

In one example, the tangential link 66 and the boomerang link 68 are positioned substantially tangential relative to the diffuser case 44 and the mounting linkage assembly 62. The tangential positioning of the tangential link 66 and the boomerang link 68 creates a near ideal loading arrangement for the transmission of vertical loads to the pylon 12.

The tangential link 66 and the boomerang link 68 maintain the vertical positioning of the gas turbine engine 10 relative to the pylon 12. In one example, the boomerang link 68 includes three contact points 90 and the tangential link 66 includes two contact points 90. The actual number of contact points 90 included on the boomerang link 68 and the tangential link 66 will vary depending upon design specific parameters. The boomerang link 68 reacts both vertical loads and side loads of the gas turbine engine 10. The tangential link 66 reacts both vertical loads and torque loads of the gas turbine engine 10.

Each of the first body portion 72 and the second body portion 74 of the mounting linkage assembly 62 includes a fail safe linkage 92, 94, respectively, that protrudes therefrom in a direction towards the diffuser case 44. The fail safe linkages 92, 94 are connected to a linkage connector 96 of the diffuser case 44. In one example, the fail safe linkages 92, 94 are pinned to the linkage connector 96 of the diffuser case 44 (See FIG. 5B). The boomerang link 68 is connected at one of its contact points 90 between the fail safe linkages 92, 94. The fail safe linkages 92, 94 support vertical loads associated with the gas turbine engine 10 and provide redundant connection of the gas turbine engine 10 to the pylon 12 in the event that one or both of the tangential link 66 and the boomerang link 68 fail during engine operation.

Figure 7:
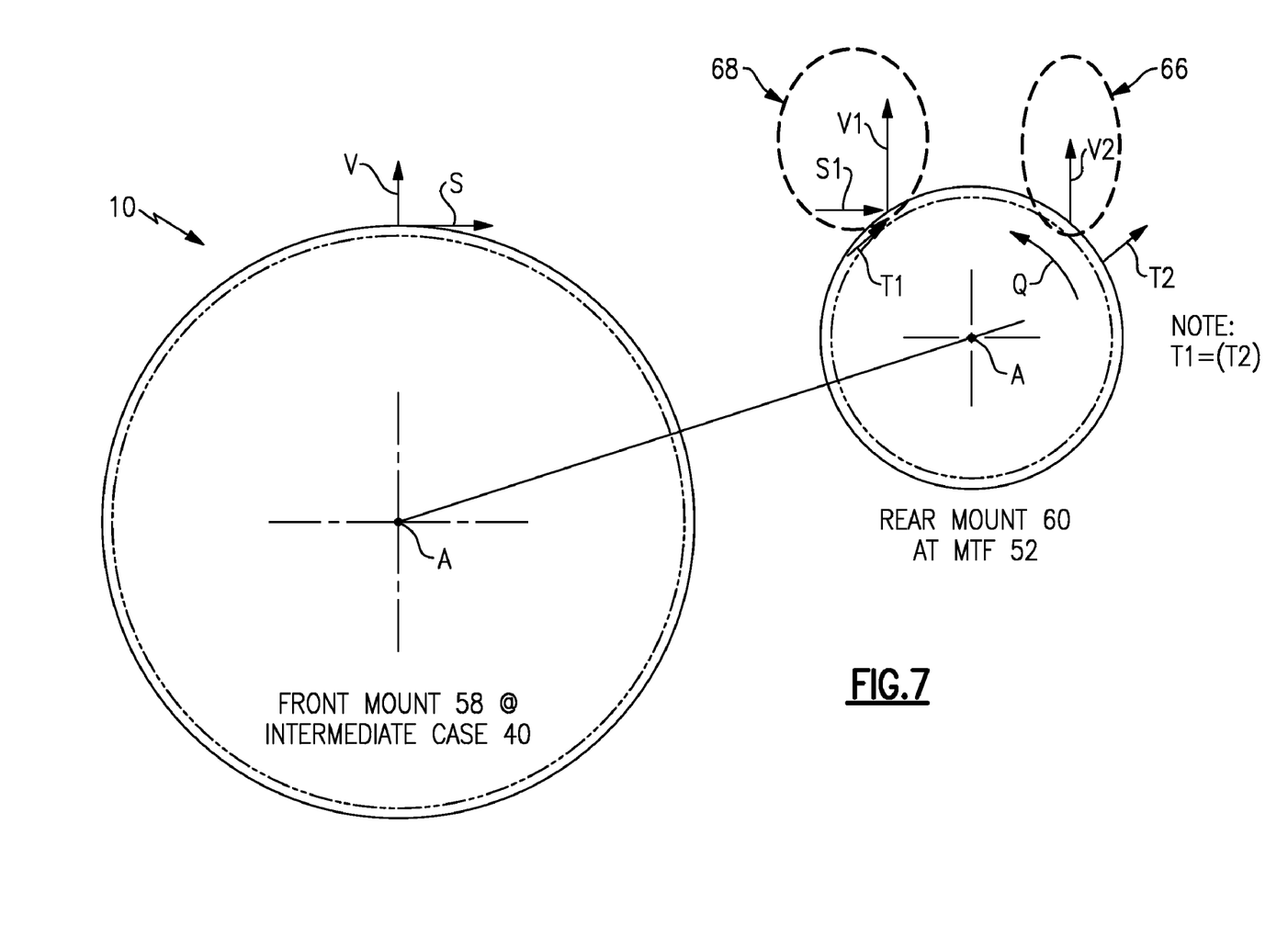
FIG. 7 illustrates a free body diagram illustrating loads reacted by the example mounting system of FIG. 3-6.

FIG. 7, with continuing references to FIGS. 1-6, is a free body diagram that schematically illustrates a variety of engine loads that are reacted by the example mounting system 56. In this example, the front mount 58 is operable to react both vertical loads V and side loads S adjacent a forward end of the gas turbine engine 10. Vertical loads V are loads created by the weight of the gas turbine engine 10. Side loads S are engine loads that are created by crosswinds and/or maneuvering of the gas turbine engine 10. Both the vertical loads V and the side loads S act upon the gas turbine engine 10 in a direction that is perpendicular to the longitudinal centerline axis A. The vertical loads V and the side loads S are absorbed by the front mount 58, and are communicated from the core engine to the pylon 12. In one example, the front mount 58 is not required to react thrust loads of the gas turbine engine 10.

In the illustrated example, the rear mount 60 reacts thrust loads T, side loads S, vertical loads V and torque loads Q. Thrust loads T are loads that act upon the gas turbine engine 10 in a direction that is parallel to the engine longitudinal centerline axis A. Thrust loads occur during propulsion of the aircraft and are generally experienced in a direction opposite of aircraft travel.

The boomerang link 68 supports a vertical load V1 and a side load S1. The boomerang link 68 communicates the vertical load V1 and the side load S1 from the diffuser case 44, through the boomerang link 68 and the mounting linkage assembly 62, and to the pylon 12 to dissipate the loads.

The tangential link 66 supports a vertical load V2 and a torque load Q that is associated with rotation of the gas turbine engine 10. The vertical load V2 and the torque load Q are communicated from the diffuser case 44, through the tangential link 66 and the mounting linkage assembly 62, and to the pylon 12 to dissipate the loads.

The thrust links 64 support thrust loads T1 and T2 of the gas turbine engine 10. The thrust links 64 communicate the thrust loads T1, T2 from the diffuser case 44, through the thrust links 64 and the mounting linkage assembly 62, and to the pylon 12 to dissipate the thrust loads T1, T2. The mounting linkage assembly 62 absorbs the numerous vertical loads V, side loads S, thrust loads T, and torque loads Q from the thrust links 64, tangential link 66, and the boomerang link 68 and dissipates these loads to the pylon 12.

The foregoing description shall be interpreted as illustrative and not in any limiting sense. A worker of ordinary skill in the art having the benefit of this disclosure would recognize that certain modifications would come within the scope of this disclosure. For that reason, the following claims should be studied to determine the true scope and content of this disclosure.

What is claimed is:

1. A mounting system for a gas turbine engine, comprising:
   a mounting linkage assembly that reacts at least a thrust load at a rear portion of the gas turbine engine;
   at least one tangential link positioned generally transverse to said mounting linkage assembly and operable to react at least a vertical load, a side load and a torque load; and
   at least one thrust link connected to said mounting linkage assembly and extending in a downstream direction relative to the gas turbine engine.

2. The mounting system as recited in claim 1, wherein said mounting linkage assembly includes a first body portion and a second body portion separate from said first body portion.

3. The mounting system as recited in claim 1, wherein said mounting linkage assembly includes a swing beam and a plurality of link connectors that connect said at least one tangential link.

4. The mounting system as recited in claim 3, wherein a thrust link is connected to opposing sides of said swing beam, and said swing beam equalizes said thrust load between said thrust links.

5. The mounting system as recited in claim 1, wherein said at least one tangential link includes a boomerang link having at least three contact points and a tangential link having at least two contact points.

6. The mounting system as recited in claim 5, wherein said boomerang link reacts at least a vertical load and a side load and said tangential link reacts at least a vertical load and a torque load.

7. The mounting system as recited in claim 5, wherein said boomerang link and said tangential link are connected between the gas turbine engine and said mounting linkage assembly.

8. The mounting system as recited in claim 1, comprising a swing beam that is rotatably secured relative to said mounting linkage assembly.

9. The mounting system as recited in claim 8, wherein said at least one thrust link is mounted to said swing beam.

10. The mounting system as recited in claim 1, wherein said mounting linkage assembly includes at least one fail safe linkage that protrudes in a direction toward the gas turbine engine.

11. The mounting system as recited in claim 10, comprising a boomerang link connected between a link connector and said at least one fail safe linkage of said mounting linkage assembly.

12. A mounting system for a gas turbine engine, comprising:
    a pylon;
    an engine static case structure; and
    a mounting linkage assembly connected radially between said pylon and said engine static case structure, wherein said mounting linkage assembly includes thrust links that extend in a downstream direction relative to said engine static case structure, a tangential link, a boomerang link on an opposing side of said mounting linkage assembly from said tangential link, and a fail safe linkage disposed between said tangential link and said boomerang link, wherein a linkage connector of said engine static case structure is received by said fail safe linkage.

13. A mounting system for a gas turbine engine, comprising:
    a mounting linkage assembly that reacts at least a thrust load;
    at least one tangential link positioned generally transverse to said mounting linkage assembly and operable to react at least a vertical load, a side load and a torque load; and
    at least one thrust link connected to a swing beam of said mounting linkage assembly and extending in a downstream direction relative to the gas turbine engine.

* * * * *